United States Patent [19]

Blunden et al.

[11] Patent Number: 4,838,743

[45] Date of Patent: Jun. 13, 1989

[54] VEHICLE CANTILEVER CHOCK BLOCK APPARATUS FOR RAILROAD CAR TRANSPORT OF VEHICLES

[75] Inventors: Donald J. Blunden, Plymouth; Michael J. Rench, Wyandotte, both of Mich.

[73] Assignee: Thrall Car Manufacturing Company, Chicago Heights, Ill.

[21] Appl. No.: 165,845

[22] Filed: Mar. 9, 1988

Related U.S. Application Data

[63] Continuation-in-part of Ser. No. 928,560, Nov. 10, 1986, abandoned.

[51] Int. Cl.[4] .............................................. B60P 3/07
[52] U.S. Cl. ......................................... 410/9; 410/30
[58] Field of Search ................... 410/4, 7–12, 410/19–21, 26, 30; 188/32

[56] References Cited

U.S. PATENT DOCUMENTS

| 1,279,397 | 9/1918 | Michod | 410/20 |
| 4,682,922 | 7/1987 | Andre et al. | 410/30 |

FOREIGN PATENT DOCUMENTS

| 1469877 | 1/1967 | France | 410/30 |
| 129424 | 1/1978 | German Democratic Rep. | 410/30 |

Primary Examiner—Robert B. Reeves
Assistant Examiner—Frank H. Williams, Jr.
Attorney, Agent, or Firm—Marshall, O'Toole Gerstein, Murray & Bicknell

[57] ABSTRACT

Transportation equipment having at least one deck for supporting and transporting four-wheel vehicles such as automobiles and trucks; at least one track secured to the deck; the track having a pair of substantially upwardly extending spaced apart surfaces; chock blocks for a vehicle transported on the deck to secure the vehicle against longitudinal movement; each chock block having a horizontal first member which nests with the track and is quickly removable from such nesting arrangement by upward displacement; each chock block having a second member substantially horizontally positioned and permanently laterally joined to the first member; the second member having a sufficient length to extend along, and terminate beyond, the tread face of a tire of a vehicle located along side the track; and the chock block having a lock for removably securing the first member to the track, when in nesting position therewith, to prevent the chock block from horizontal movement along the track and upward movement from the track.

26 Claims, 10 Drawing Sheets

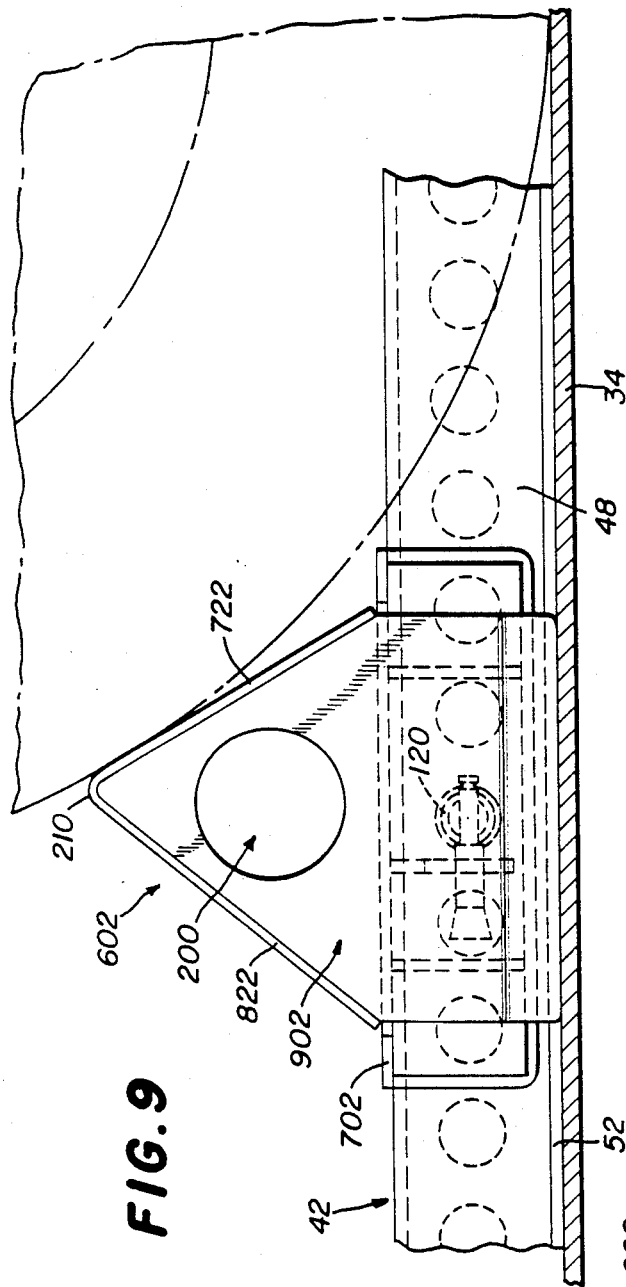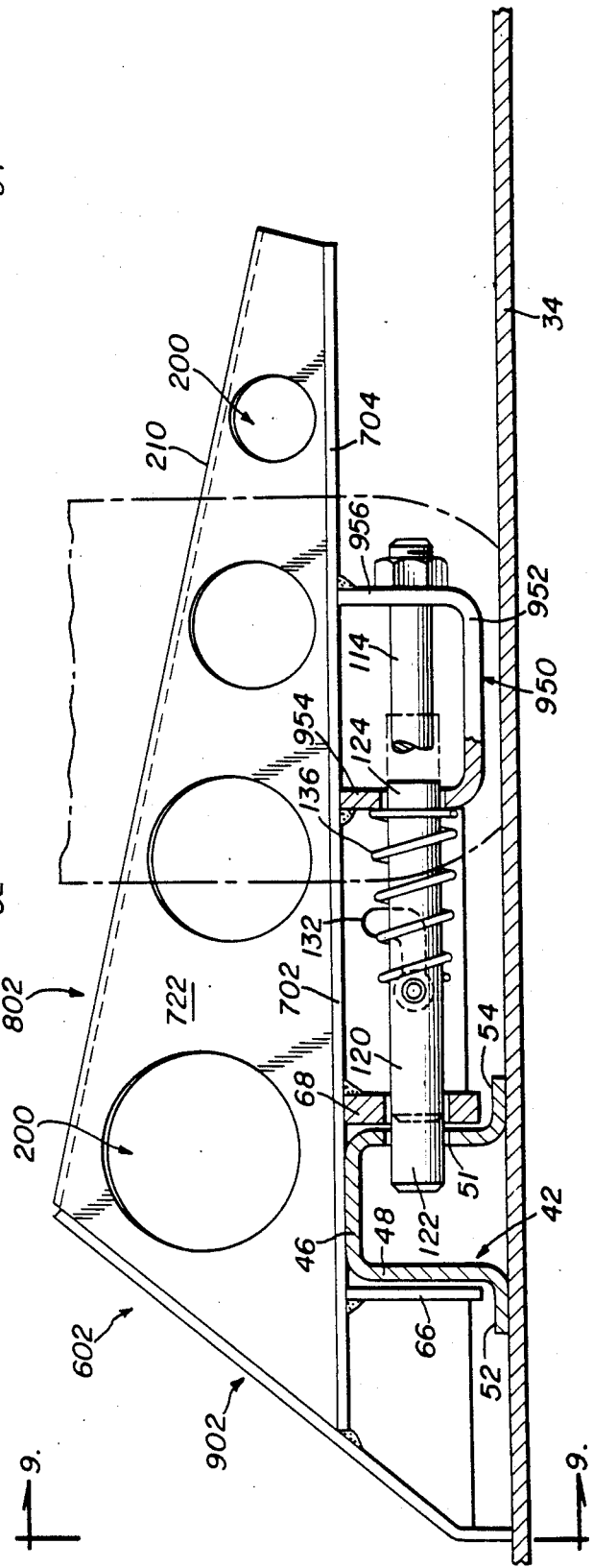

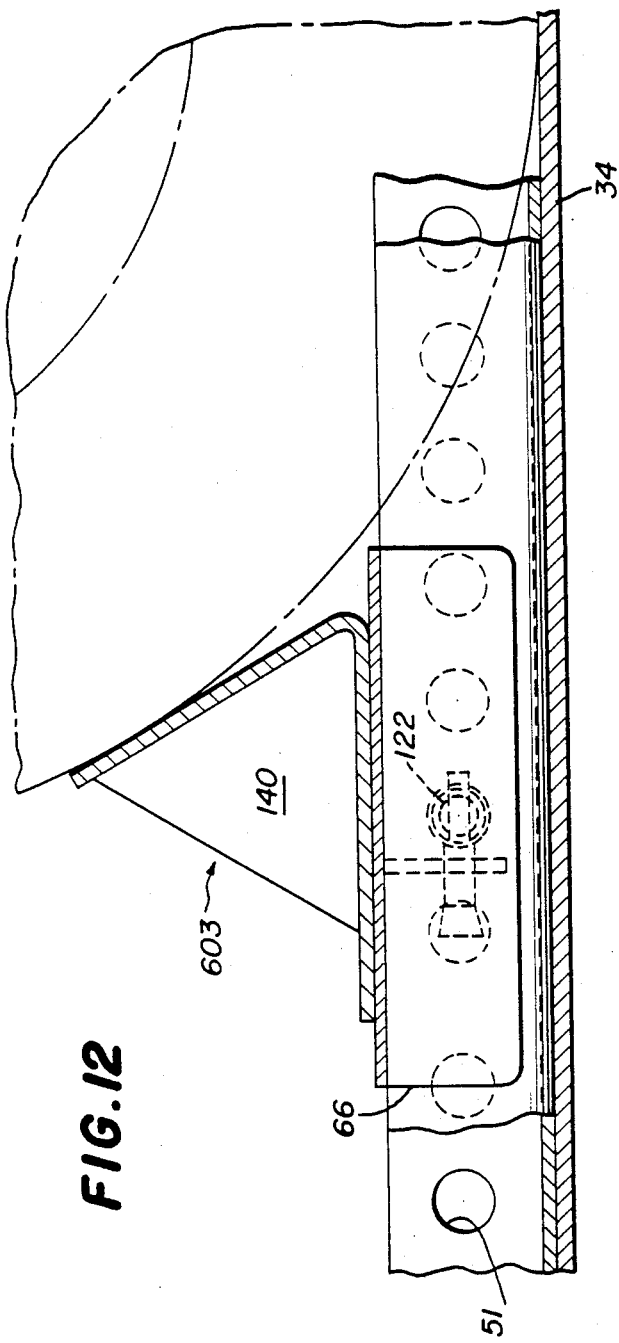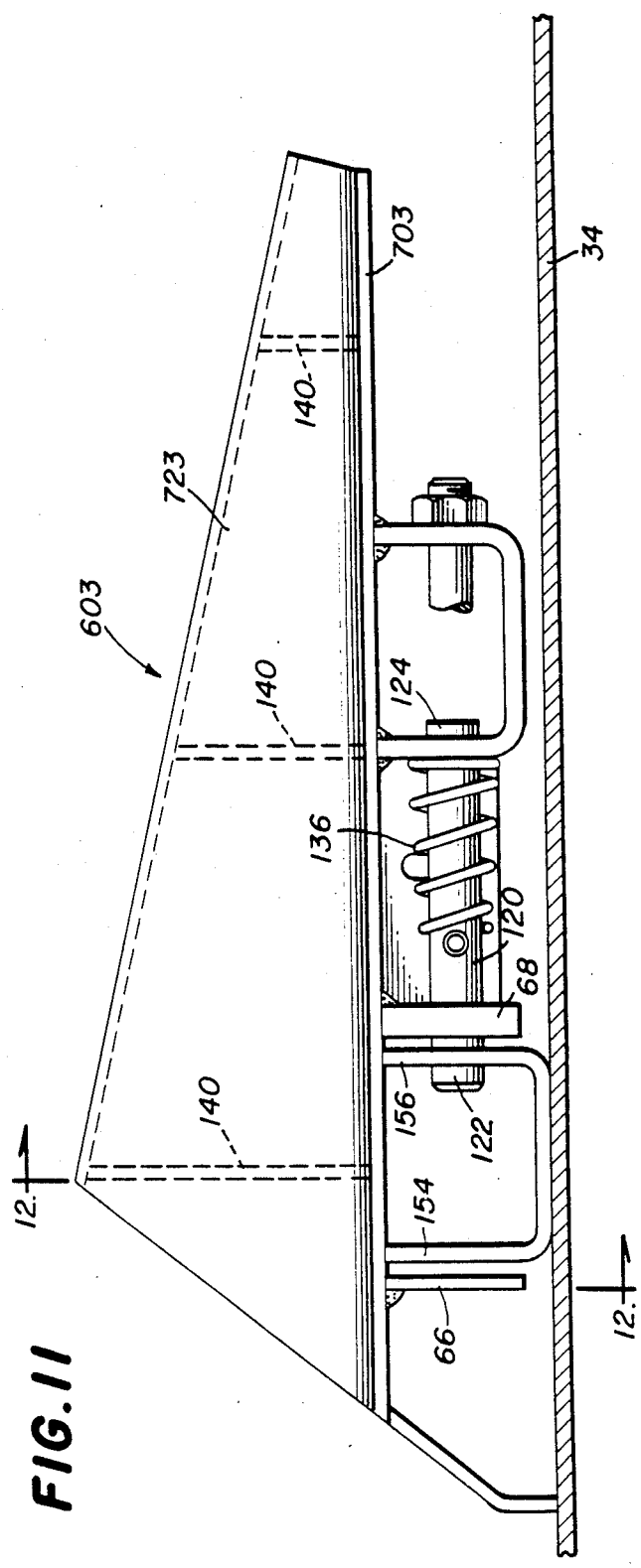

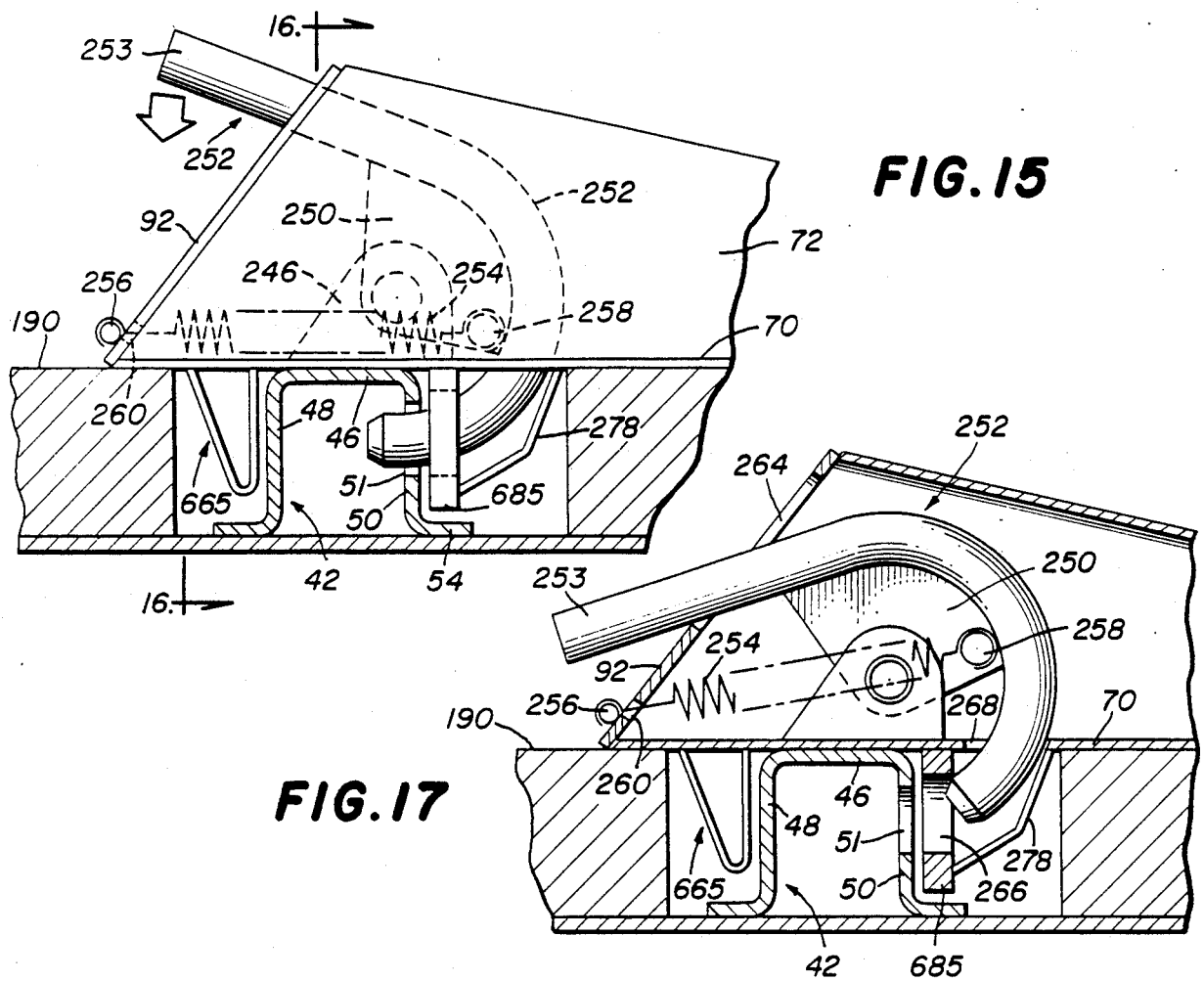
FIG. 15
FIG. 17
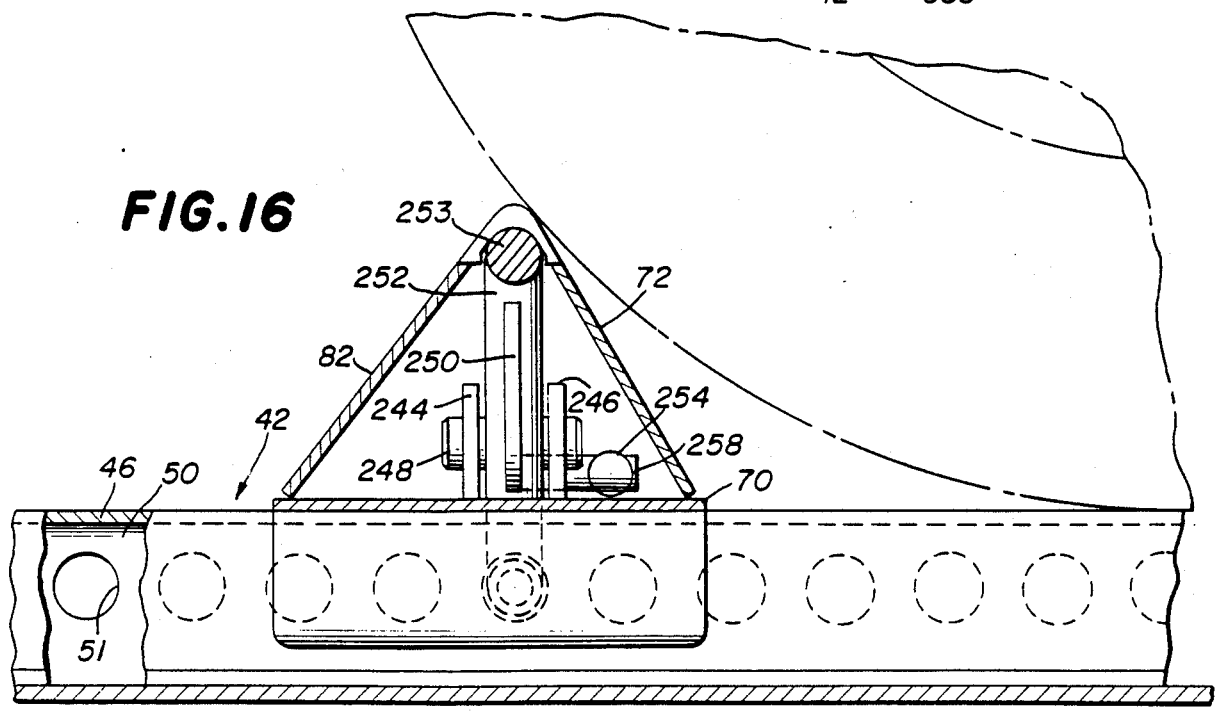
FIG. 16

VEHICLE CANTILEVER CHOCK BLOCK APPARATUS FOR RAILROAD CAR TRANSPORT OF VEHICLES

This application is a continuation-in-part of our co-pending application Ser. No. 928,560 filed Nov. 10, 1986, now abandoned.

This invention relates to railroad cars, over-the-highway trucks and trailers, containers, ships, barges and boats and air cargo planes used to transport vehicles such as automobiles and trucks. More particularly, this invention is concerned with improved chock block apparatus for securing vehicles being transported on or in such equipment.

BACKGROUND OF THE INVENTION

Special railroad cars are used to transport vehicles such as automobiles and trucks from manufacturing plants to distribution centers. Such railroad cars are often referred to as auto rack cars. The number of decks which support the vehicles depends on the type of vehicles to be transported. Although some cars have a single deck it is more common to have two or three decks. Each deck will usually carry about four to six vehicles in the United States.

It is necessary to tie down or secure each vehicle to its supporting deck so that it remains in position while the railroad car moves from its point of loading to its destination. The system used to tie down each vehicle must be able to hold it securely even when the railroad car is subjected to buff and draft forces as well as when it rocks, rolls and bumps.

One of the ways widely used in the United States to tie down vehicles requires a pair of parallel tracks, spaced apart about forty inches outside, on each deck. The four wheels of each vehicle span the tracks and thus provide centering guides when the vehicles are driven onto the railroad car in column formation in so-called circus loading. After a vehicle is properly positioned on a deck it is pulled down tightly by use of four chains. Two chains are used at each end. Each chain free end is hooked to the vehicle frame or body adjacent the track. The chain extends downwardly to a carriage releasably slidable in the track and carrying a winch for tightening the chain. Such apparatus is disclosed in the U.S. Pat. Nos. 3,566,803; 3,564,577; 3,374,008 and 3,673,969.

Although the described tie down apparatus has been successfully used for many years, recent vehicle structural changes have lowered road clearance, indicating that alternative systems should be used. Thus, it is no longer desirable to use a tie down system which pulls the body down and compresses the vehicle springs because this lowers the clearance between the vehicle underbody parts including mufflers, tailpipes and the like, and the deck. When the railroad car bumps and pitches, it can hit the deck and cause damage to the vehicle. Additionally, to withstand the tension applied to the underbody of the vehicle where the hooks are attached, special reinforcement must be added with increased cost solely to transport the vehicle and with no general benefit to the vehicle once it reaches its destination.

A further disadvantage of the prior art tie down system is that the laborer must have access to both sides of the vehicle; thus, space must be provided for him to work and walk on both sides. For some vehicles it is considered that tie down on one side only would be adequate if a suitable system is available. This would reduce the laborers time and lower costs.

Although the above discussion has pertained specifically to transporting vehicles on railroad cars, it is also common to transport vehicles on over-the-highway trailers and trucks, on ships, barges and boats, by air cargo planes, and in shipping containers. As to shipping containers, automobiles are very often shipped in them by railroad and ship. Thus, servicemen, such as Army and Navy personnel being transferred to and from a base overseas, take their automobiles along and in such cases the automobiles are often transported in containers. When a vehicle is shipped in a container or by trailer, truck, ship, barge, boat or air cargo plane, it is often desirable, and many times necessary, to have a tie down apparatus secure the vehicle in place.

From the above discussion it is believed clear that alternative tie down apparatus for vehicles being transported, which eliminates some or all of the disadvantages of the prior art systems, is needed.

SUMMARY OF THE INVENTION

According to one aspect of the invention there is provided transportation equipment having at least one deck for supporting and transporting four-wheel vehicles such as automobiles and trucks; at least one track secured to the deck; the track having a pair of substantially upwardly extending spaced apart surfaces; chock blocks for a vehicle transported on the deck to secure the vehicle against longitudinal movement; each chock block having a horizontal first member which nests with the track and is quickly removable from such nesting arrangement by upward displacement; each chock block having a second member substantially horizontally positioned and permanently laterally joined to the first member; the second member having a sufficient length to extend along, and terminate beyond, the tread face of a tire of a vehicle located along side the track; and the chock block having means for removably securing the first member to the track, when in nesting position therewith, to prevent the chock block from horizontal movement along the track and upward movement from the track.

The transportation equipment having the deck can be a railroad car, an over-the-highway truck or trailer, a shipping container, a ship, barge or boat or an air cargo plane.

According to a second aspect of the invention a railroad car is provided having at least one deck for supporting and transporting four-wheel vehicles such as automobiles and trucks; at least one track secured to the deck longitudinally of the railroad car, the track having a pair of substantially upwardly extending spaced apart surfaces; chock blocks for each vehicle transported on the deck to secure the vehicle against longitudinal movement; each chock block having a horizontal first member which nests with the track and is quickly removable from such nesting arrangement by upward displacement; each chock block having a second member substantially horizontally positioned and permanently laterally joined to the first member; the second member having a sufficient length to extend along, and terminate beyond, the tread face of a tire of a vehicle located along side the track; and the chock block having means for removably securing the first member to the track, when in nesting position therewith, to prevent the chock block from horizontal movement along the track and upward movement from the track.

While the deck must have at least one track, it is sometimes desirable to use two spaced apart longitudinal a track secured to the deck with enough clearance for the vehicle wheels to roll between the tracks. Additionally, some or all of the tracks can be located on top of the deck or wholly or partially below the deck top surface or face.

The chock block second member can have a bottom located on the deck. However, the bottom can be located above the car deck when the first member and the track are in nesting arrangement. The second member can have means which maintains it substantially horizontal when upward and downward forces are applied to the second member. Also, the second member can have a bottom portion supported by the first member.

The second member can have first and second ends; the first member can be located between the second member first and second ends; a first support leg, located between the first end and the first member, can extend downwardly from the second member to the deck; and a second support leg, located between the second end and the first member, can extend downwardly from the second member to the deck. When the chock block is positioned on a track and against a vehicle tire the second member second end will be located beneath the vehicle and the second member first end will be spaced laterally outwardly away from the outer side of the tire and the track.

The upwardly extending spaced apart surfaces of each track can be defined by spaced apart walls and the first member can have a pair of spaced apart walls which nest with the track walls.

The track can be a channel with its open side facing upwardly or it can be an inverted channel. The track can also be shaped like an L or an inverted T. The first member can define a channel which has its open side facing downwardly and it can be sized to nest a track in close proximity therewith.

The means for removably securing the first member to the track when in nesting position therewith can comprise a movable pin mounted on the chock block; the pin can have a forward end; the first member can have a hole into which the pin forward end can extend through and into one of a plurality of horizontally disposed spaced apart holes in the track; and means can be included to withdraw the pin forward end from the track hole to remove the chock block from the track.

The pin can be axially movable and the pin back end can be slidably mounted in a hole in a vertical plate joined to the chock block and spring means included to drive the pin forward a limited distance. The pin can have a lateral handle movable in a slot in a plate joined to the chock block with movement of the handle in the slot determining maximum axial movement of the pin. The slot can have means for retaining the handle in maximum retracted position with the forward end of the pin located in but not extending out of the hole in the first member.

The second member can have a flat bottom plate, extending for about its length, a plate with a lower edge joined to the bottom plate and sloping upwardly, and bracing members extending from the sloped plate to the bottom plate.

The second member can have a flat bottom plate, extending for about its length, and a pair of plates with lower edges joined to the bottom plate and sloped upwardly toward each other and with the plates having upper edges joined together. Each of the pair of upwardly sloped plates can be substantially triangular; the second member can have first and second ends; the first member can be located between the second member first and second ends; the second member first end can terminate beyond the tire tread; and the lower edges of the pair of plates can be about the same length and can terminate at the second end beyond the tire tread face. The second member bottom plate can in part constitute a top plate for the first member and the first member can include a pair of spaced apart parallel vertical walls, which nest with the track, joined to the lower surface of the bottom plate.

Each of the pair of upwardly sloped plates can have an upward end edge and an end plate, sloped from vertical, with a triangular upper portion joined to the end of the bottom plate and to the end edges of the sloped plates, and the end plate can have a lower portion projecting downwardly to the car deck.

One or both sloped plates can have one or more holes or openings to reduce weight. The edges of the holes can be flared outwardly a short distance to provide gripping openings and edges into and against which tires can press and thereby be additionally restrained against movement.

The chock block can have means for connecting a vehicle wheel tie-down strap to the chock block. By using two chock blocks, with each one being on opposite sides of the same tire tread, a tie-down strap means can be brought over the tire or axle and one end of the strap means can be connected to one chock block and the other end of the strap means can be connected to the other chock block to further secure the vehicle against horizontal and vertical displacement. When the chock blocks are to be used in conjunction with a tie-down strap one chock block of a pair of chock blocks will desirably have a first end of the strap permanently connected to the chock block second member between its second end and the chock block first member. The other chock block of the pair of chock blocks desirably will have means located on the chock block between the second member second end and the first member for releasably connecting a second end of the tie-down strap thereto. To quickly and operatively connect the tie-down strap second end to the chock block, the second member can have a conventional small winch permanently connected to it. After the strap is positioned over a vehicle tire the strap second end can be inserted into the winch and then tightened by means of the winch to apply adequate tension on the strap to hold the vehicle wheel down.

BRIEF DESCRIPTION OF THE DRAWINGS

FIG. 8 is a side elevational view, similar to FIG. 4, of a second embodiment of chock block apparatus connected to a track on a railroad car deck according to the invention;

FIG. 9 is an end elevational view of the chock block apparatus taken along the line 9—9 of FIG. 8;

FIG. 11 is a side elevational view of a third embodiment of chock block apparatus connected to a channel track;

FIG. 12 is a sectional view taken along the line 12—12 of FIG. 11;

FIG. 15 is a side elevational partial view of a fifth embodiment of chock block apparatus locked to a track located below a car deck surface;

FIG. 16 is a sectional view taken along the line 16—16 of FIG. 15;

FIG. 17 is similar to FIG. 15 but shows the chock block apparatus unlocked from the track;

DETAILED DESCRIPTION OF THE DRAWINGS

To the extent it is reasonable and practical the same or similar elements or parts which appear in the various views of the drawings will be identified by the same numbers.

Figure 1:
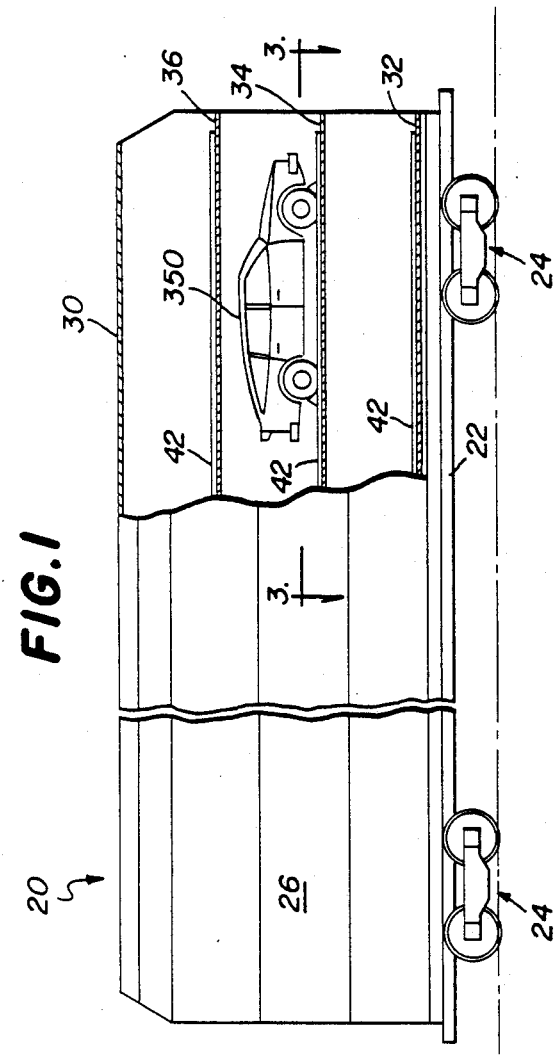
FIG. 1 is a side elevation of a railroad car having chock block apparatus connected to tracks on the car decks.
Figure 3:
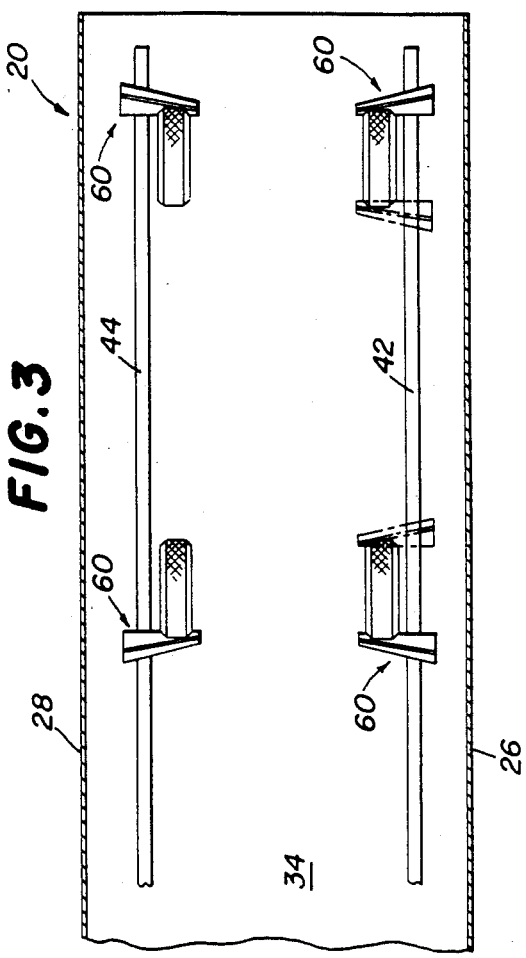
FIG. 3 is a sectional view of FIG. 1 taken along the line 3—3.
Figure 2:
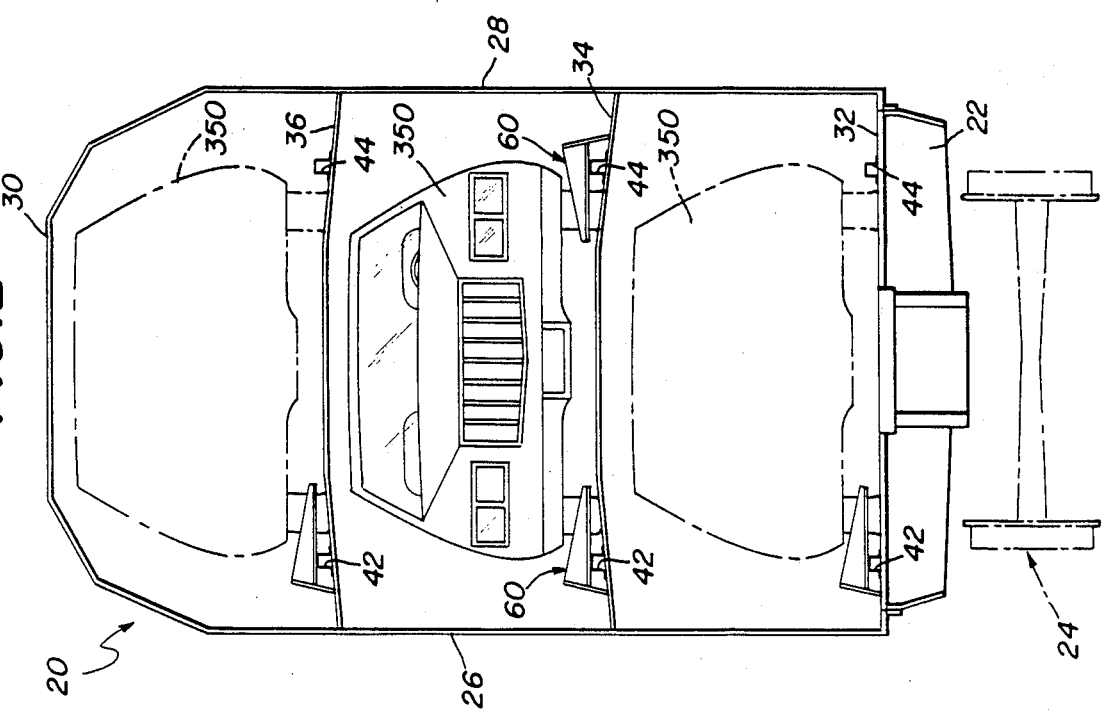
FIG. 2 is an end view of the railroad car shown in FIG. 1.

With reference to FIGS. 1 to 3, the railroad car 20 has an underframe 22 supported by a pair of wheel trucks 24. Extending upwards from underframe 22 are sidewalls 26,28 to which roof 30 is connected.

The railroad car 20 has three decks 32,34 and 36. Deck 32 is supported on underframe 22 and decks 34 and 36 are supported by column members, not shown, along the sides of the car 20. The height between adjacent decks and between the top deck 36 and the car roof 30 is approximately equal.

Each deck of the railroad car 20 shown in FIGS. 1 to 3 has a pair of identical parallel longitudinal tracks 42,44 spaced apart sufficiently so that the wheels of vehicles 350 can roll in a path between the tracks. Two tracks are to be used when a chock block according to the invention is used to secure a vehicle in position at all four tires, whether outside the wheelbase length as shown in FIG. 3, or inside the wheelbase length (not shown). However, only one track 42,44 need be installed. If two tracks are installed only one need be used when two or four chock blocks are used to chock two tires on the same vehicle side. With two tracks, four chock blocks can be used to chock two front tires, two rear tires, or one front tire and one diagonally located rear tire. Additionally, with two tracks and four chock blocks a vehicle can be secured in place by using four chock blocks per vehicle with all four chock blocks located between the axles or outside the axles.

Each of tracks 42,44 is a hat-shaped inverted channel in cross-section. The tracks have a top 46, vertical spaced-apart side walls 48,50 extending downwardly from top 46 and flanges 52,54 projecting outwardly from side walls 48,50 respectively. Flanges 52,54 are joined to the respective car deck, such as deck 34, on which they are located. The side walls 48,50 provide a pair of substantially vertical surfaces which serve to prevent the chock block from swinging about a vertical axis as will be clear from the subject description. Side wall 50 is provided with a plurality of horizontally spaced apart aligned holes 51.

Referring to FIGS. 4 to 7, the chock block 60 has two major functioning members which are first member 62 and second member 80. The first member 62 is horizontally located and adapted to nest with track 42,44. In the embodiment illustrated by FIGS. 4 to 7, the first member 62 includes the spaced-apart vertical plates 66,68 which are joined at the top to the lower surface of plate 70 which constitutes a bottom for the second member 80. Since the plates 66,68 are joined to plate 70, the portion of plate 70 between plates 66,68 may also be considered to be part of the first member 62. The first member 62 nests over track 42 in that the side walls 66,68 are positioned close to but slightly outwardly of the outer surfaces of track side walls 48,50. Downward displacement of first member 62 is stopped when plate 70 rests on track top 46.

The second member 80 includes bottom plate 70 to which front sloped wall 72 and rear sloped wall 82 are joined. Front sloped wall 72 is in the general form of a long triangle having a lower edge 74, an upper edge 76 and an end edge 78. Rear sloped wall 82 is also in the form of a long triangle having a lower edge 84, an upper edge 86 and an end edge 88. The lower edge 74 of sloped wall 72 is joined to bottom plate 70. Similarly, the lower edge 84 of sloped wall 82 is joined to bottom plate 70. The top edges 76,86 are joined together to form a peak at the top of the sloped walls 72,82.

Figure 4:
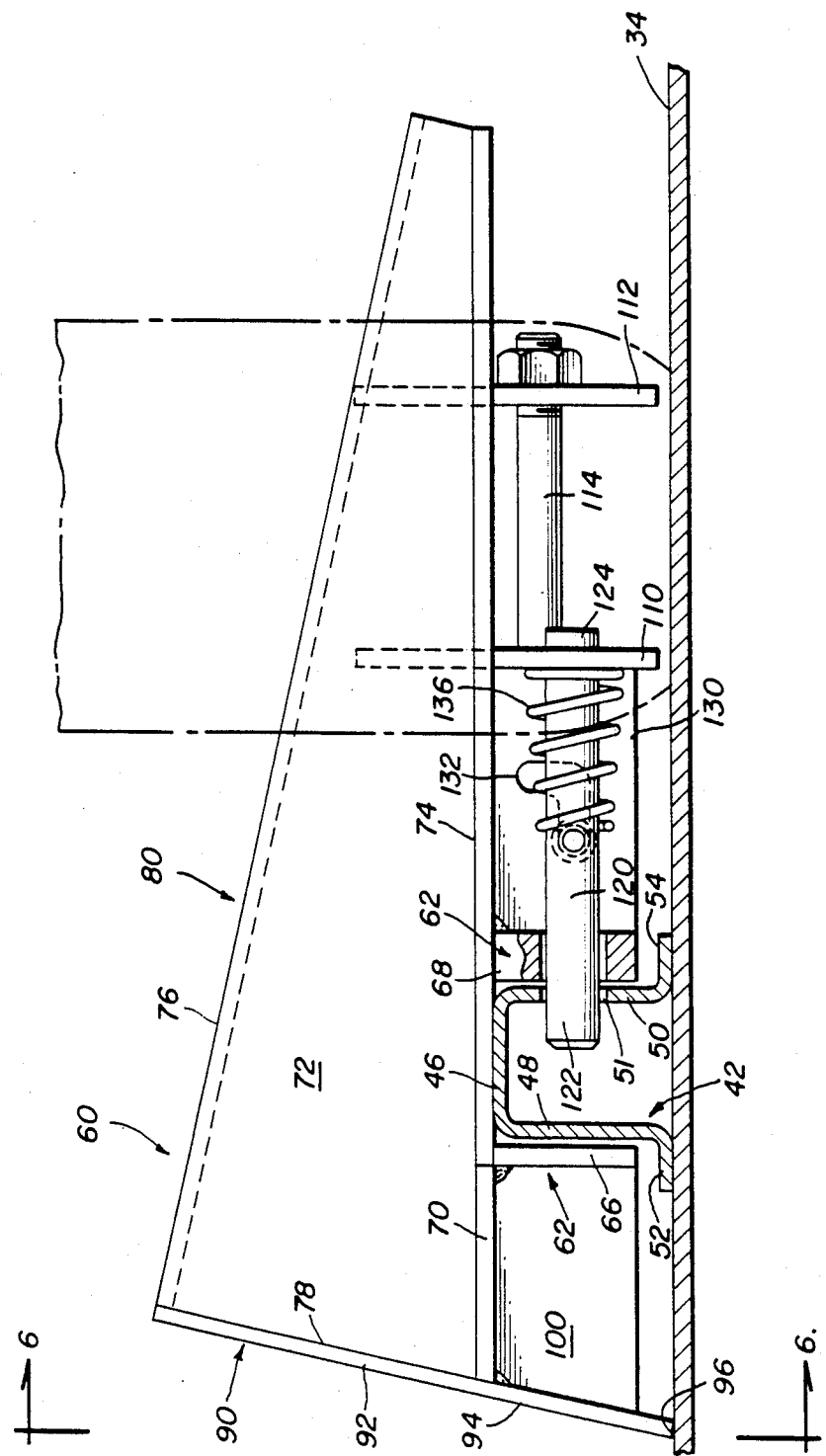
FIG. 4 is a side elevational view of one embodiment of chock block apparatus, according to the invention, connected to tracks on a railroad car deck and abutting a vehicle tire.
Figure 5:
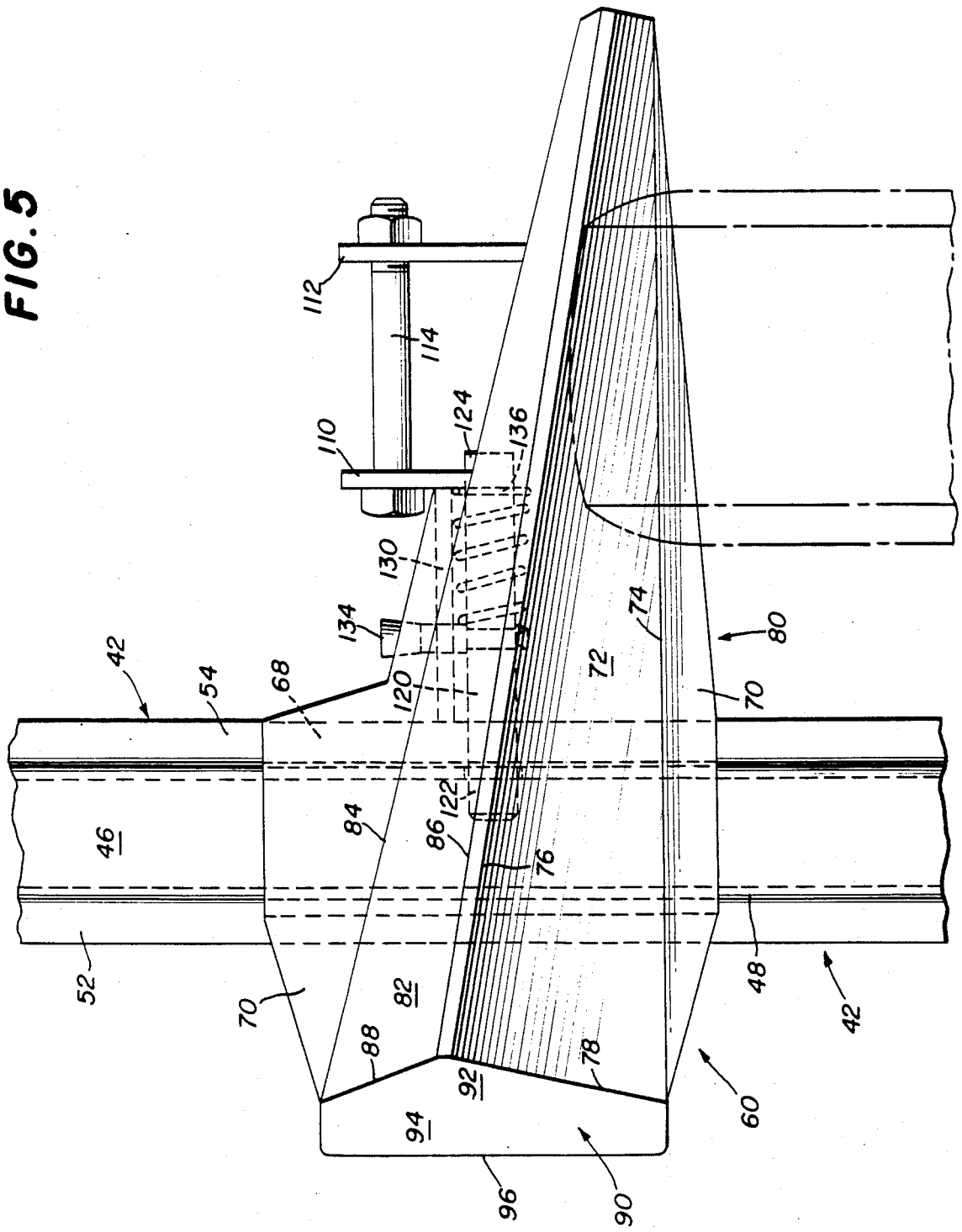
FIG. 5 is a plan view of the chock block apparatus of FIG. 4.
Figure 6:
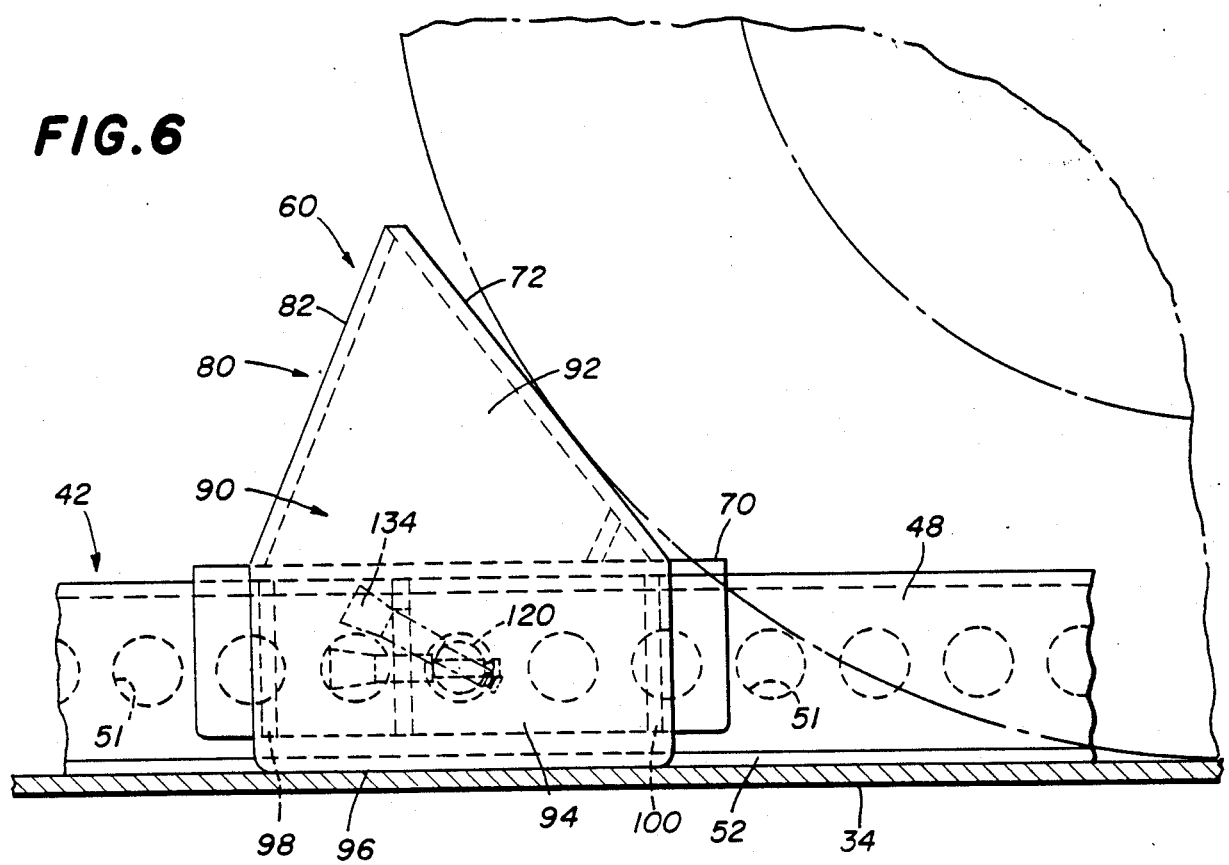
FIG. 6 is an end view of FIG. 4 taken along the line 6—6.
Figure 7:
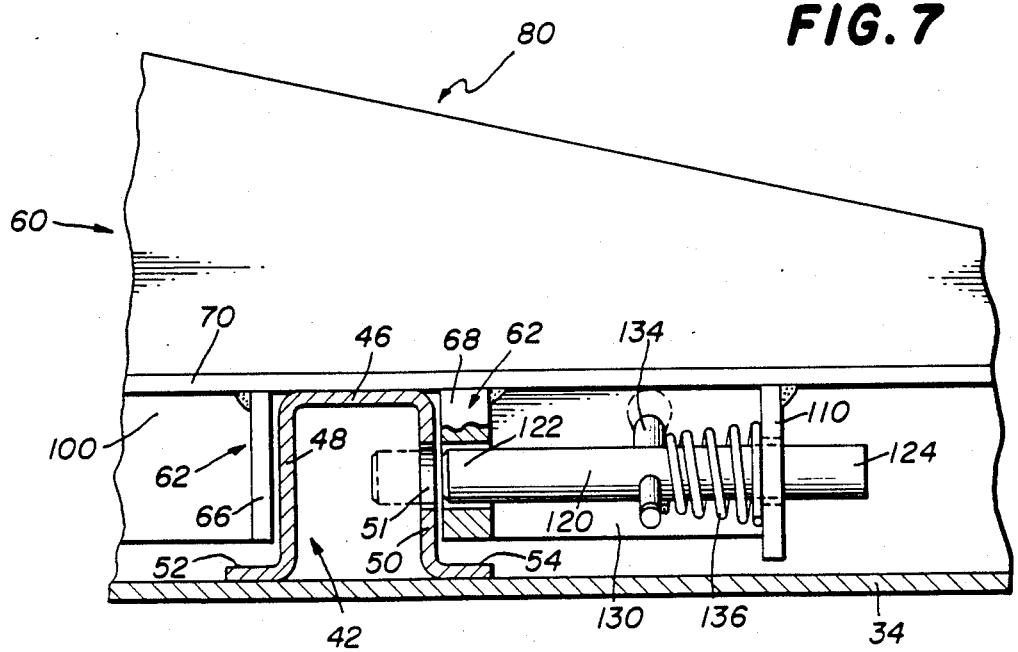
FIG. 7 is a side elevational view of the chock block apparatus as shown in FIG. 4 but with the pin fully retracted and the pin handle in locked position.

The second member 80 also has an end plate or wall 90. End plate 90 has a triangular upper portion 92 joined to the end edges 78,88 of front and rear walls 72,82 respectively, and to the adjoining end of bottom plate 70. The end plate 90 also has a rectangular portion 94 extending downwardly from the bottom of triangular upper portion 92. The rectangular portion 94 terminates in a bottom end 96 intended to be at the surface of car deck 34. A pair of vertical flanges 98,100 extend from and are joined to vertical plate 66 and to rectangular portion 94 as well as to bottom plate 70. The rectangular portion 94 functions as a support left for the chock block and prevents it from being lifted in a counterclock direction when viewed as shown in FIG. 4. Such an upward force could be applied by a tie-down strap connected to chock blocks on each side of and lateral to the same tire tread and running over the tire top or upper portion, or vehicle axle.

A pair of spaced apart vertical parallel plates 110,112 is connected to the bottom plate 70. A bolt or pin 114 extends through plates 110,112 and is secured thereto. The bolt provides an attachment for the end of a tie down strap which optionally may be run over one or more of the vehicle tires.

The axially movable horizontal pin 120 has a forward end 122 and a rear or back end 124. The forward end 122 is slidably positioned in plate 68 and the rear end is slidably positioned in a hole in plate 110. Plate 130 extends between and is joined to vertical plates 68 and 110 and also to bottom plate 70. An L-shaped slot 132 is located in plate 130 and is positioned to receive pin handle 134 in a slidable manner. Coil compression spring 136 surrounds pin 120 between handle 134 and plate 110 and thus forces pin 120 forward for a distance slightly less than the horizontal length of slot 132 due to the diameter of the handle. With the pin in forward position and located in a hole 51 in track wall 50 the chock block is prevented from movement about a horizontal or vertical axis, and is prevented from sliding on the track. Downward movement of the chock block 60 adjacent a tire is prevented by the lower ends of plates 110,112 which contact the car deck 34.

When the chock block 60 is in locked position it is positioned to be in contact with or very close to the tire to limit movement of the vehicle 350. To remove the chock block 60 from locked position on the track 42 the pin handle 134 is pulled back to the end of slot 132 thereby compressing spring 136. The handle 134 is then raised into the vertical leg of slot 132 and released. This automatically keeps the pin 120 in retracted position with the pin forward end recessed in plate 68, thereby preventing it from obstructing removal of the chock block 60 from, and installing it on, the track. When a vehicle is positioned on the deck and is ready to be secured in place, the chock block 60 is positioned so that the first member 62 nests on a track 42,44 away from the tire a short distance. Then the chock block 60 is slid against the tire and handle 134 released so that pin 120 can be moved into a hole in the track.

When a vehicle is to be secured in place using only two chock blocks 60, each will be a mirror image of the other. Similarly, when four chock blocks 60 are used, two of them will be identical and the other two will be mirror images of them. When installing the chock blocks 60 to secure a vehicle in place, a chock block 60 is used which will place pin 120 on the side away from the tire so that the tire does not prevent access to the pin.

Figure 10:
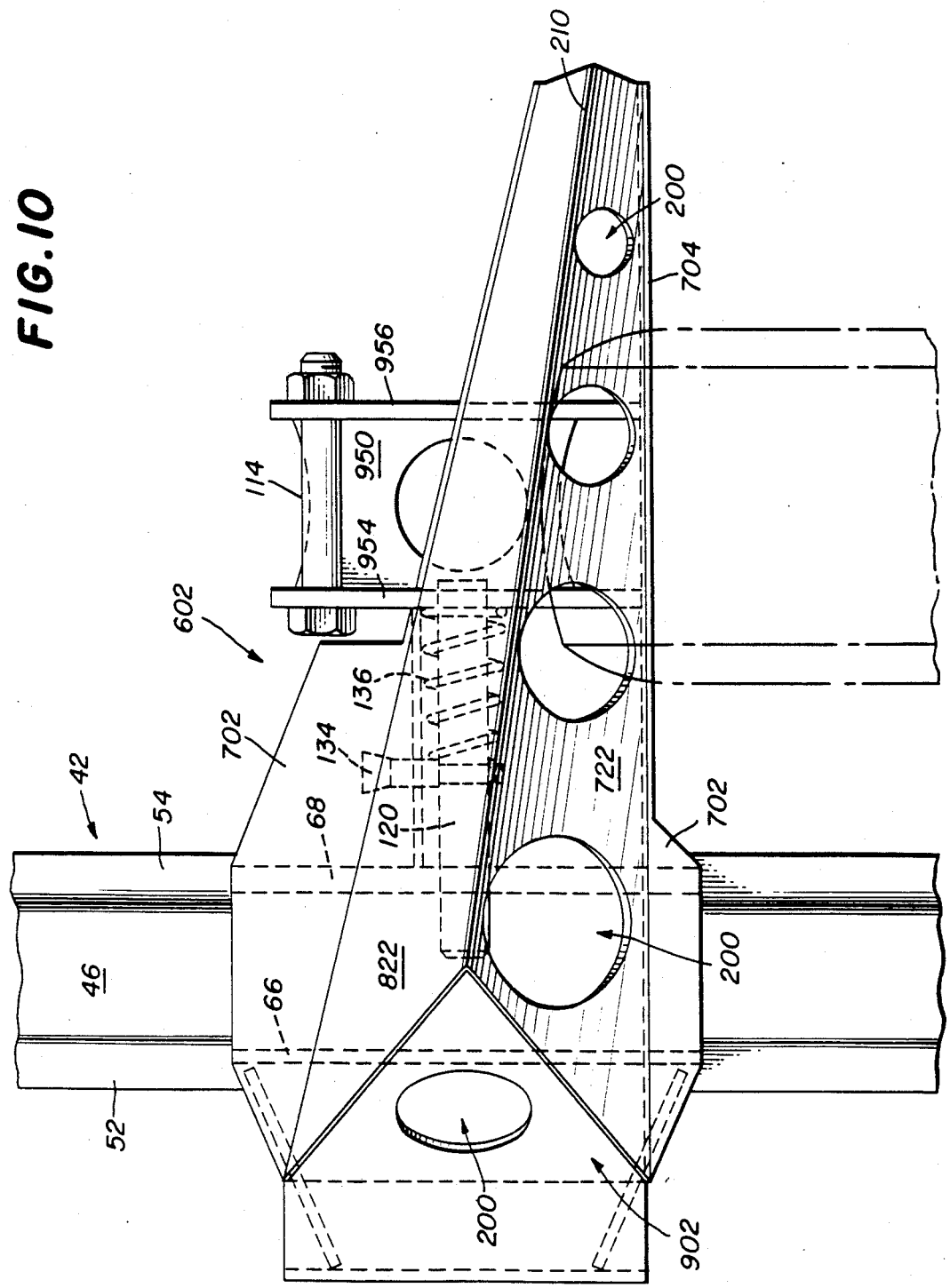
FIG. 10 is a plan view of the chock block apparatus shown in FIG. 8.

A second embodiment of chock block 602 is illustrated by FIGS. 8 to 10. The chock block 602 is similar to the first chock block embodiment 60 so only the significant structural differences in chock block 602 will be described in detail.

The chock block 602 will be seen in FIG. 10 to have a first member 802 bottom plate 702 which is shaped differently than bottom plate 70. Especially significant is the edge 704 which is lateral to track 42. This allows the triangular plate 722 to be sloped backward but still to present a face which is lateral to the track and to the vehicle wheel thereby presenting better tire contact.

The end plate 902 shown in FIGS. 8 to 10 is also sloped at a greater angle from vertical than is plate 90 but otherwise they function in the same way.

To reduce weight, provide handling openings and improve tire gripping, the second embodiment of chock block 602 has a plurality of punched out circular holes 200.

The chock block 602 can also have the plates 722,822 formed of a single piece of metal sheet by bending the sheet to form an integral apex or ridge 210.

Also different in chock block 602 is the use of channel member 950 (FIG. 8) in place of plates 110,112. The channel member 950 has a bottom 952 and vertical sides 954,956. Bolt or pin 114 is mounted in sides 954,956. The rear or back end of pin 120 is slidably received in a hole in channel side 954.

FIGS. 11 and 12 illustrate a third embodiment of the invention but only the main differences between this embodiment and the first two embodiments will be described.

As will be seen in FIGS. 11 and 12, the chock block 603 has a bottom plate 703 and a sloped wall plate 723 integrally joined to bottom plate 703. Spaced apart triangular gussets 140 reinforce wall 723 and keep it from bending under load.

The track to which chock block 603 is removably connected is shown in FIGS. 11 and 12 to be channel shaped with a bottom 152 and two opposing upwardly projecting walls 154,156. Wall 156 has a series of holes 51 for receiving pin forward end 122 when the chock block is in a locked position.

Figure 13:
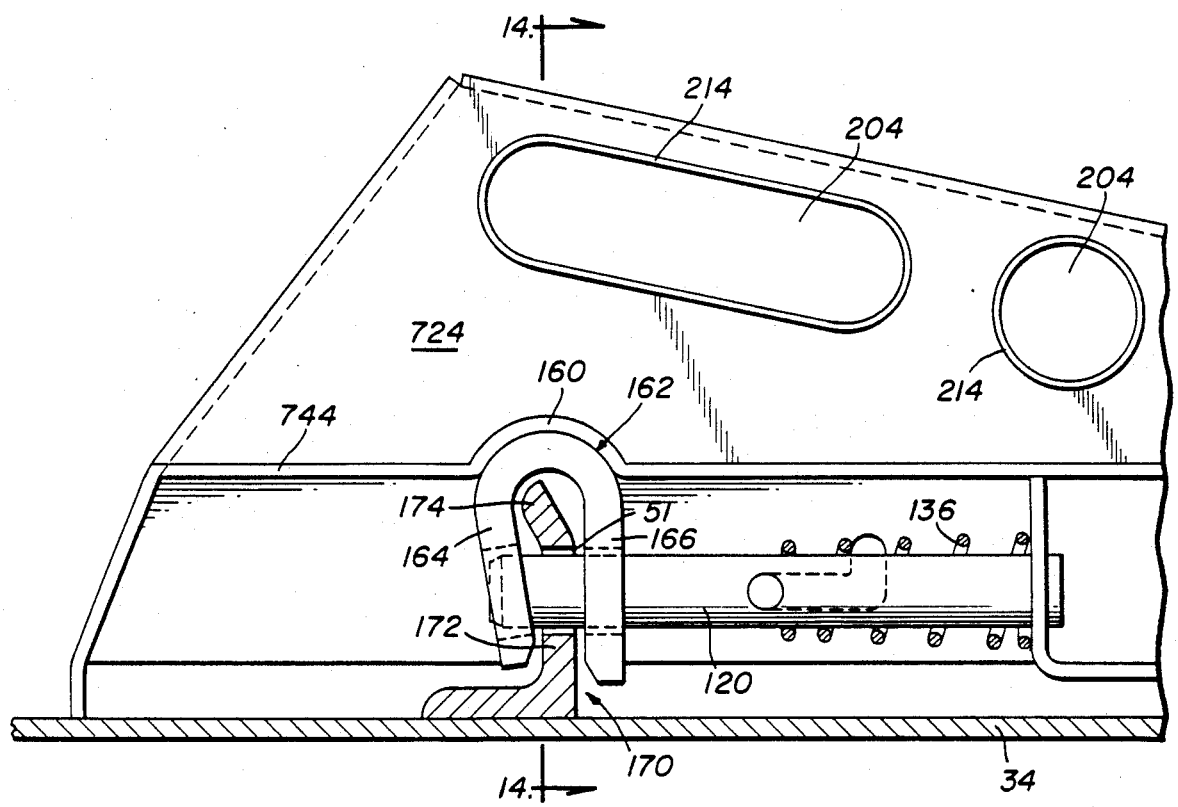
FIG. 13 is a side elevational partial view of a fourth embodiment of chock block apparatus connected to an L-shaped or angle track.
Figure 14:
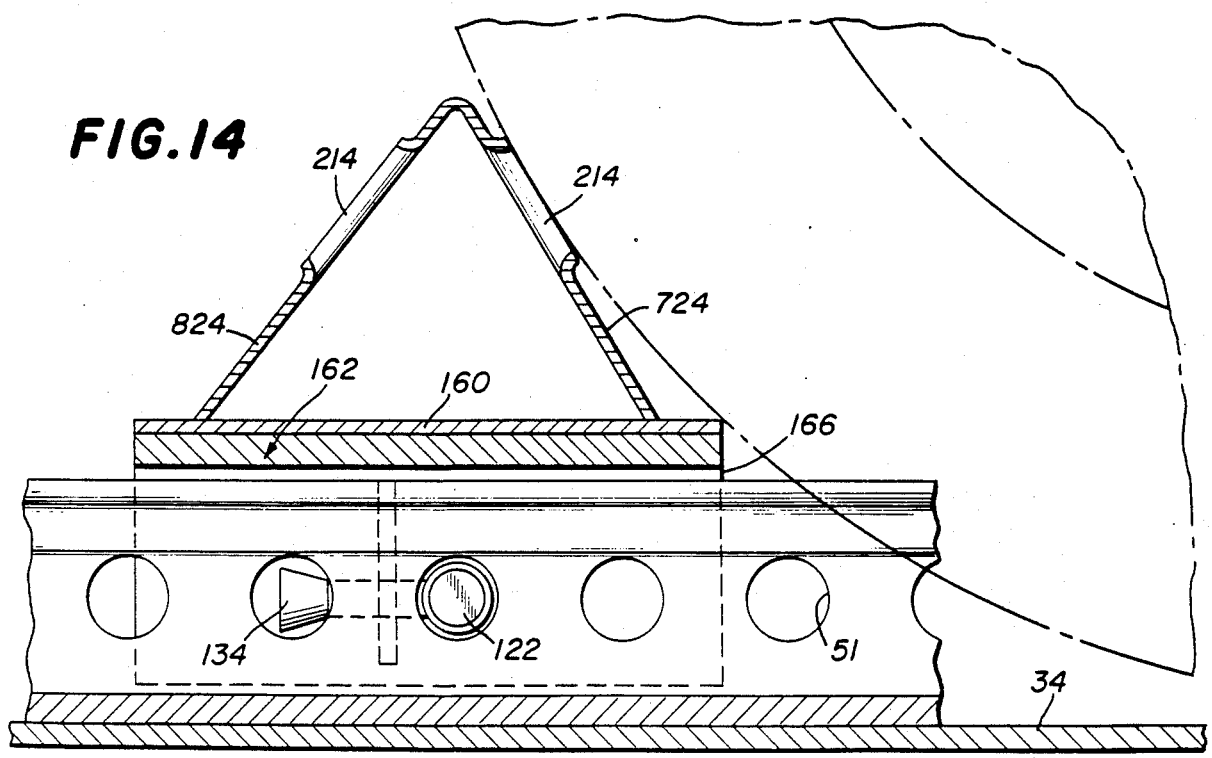
FIG. 14 is a sectional view taken along the line 14—14 of FIG. 13.

A fourth embodiment of chock block apparatus is illustrated by FIGS. 13 and 14. In this embodiment the sloped walls 724 and 824 are provided with a plurality of openings 204 which have flared edges 214 which extend laterally upwardly from the outer surface of the walls. The flared edges 214 press into the tire when forced against it thereby restraining lateral movement of the tire relative to the chock block so that further stability of the vehicle against unwanted movement is achieved.

The bottom plate 744 has an upwardly arced portion 160 to which the top of an inverted U-shaped member 162 is rigidly joined. The member 162 is positioned so that its two legs 164,166 fit on both sides of the vertical flange 172 of L-shaped track 170. The upper portion 174 of flange 172 is sloped sidewardly so as to facilitate upward movement of the chock block to remove it from the track. Pin 120 when in locking position extends through holes in both legs 164,166 and in flange 172. However, when the pin 120 is in unlocked position the pin forward end 122 is supported in the hole in leg 166 so that it does not move out of position. When so located the pin end 122 is totally free of flange 172 and does not extend out of that side of leg 166 adjacent flange 172.

FIGS. 15 to 17 illustrate a fifth embodiment characterized primarily by the chock block apparatus being removably connectable to a track 42 located below the top surface 190 of the car deck. In this embodiment the chock block bottom plate 70 is intended to rest directly on the deck top surface 190.

A pair of spaced apart vertical plates 244,246 are joined to the upper surface of bottom plate 70. A small horizontal shaft 248 extends loosely through holes in the plates 244,246. A plate 250 is connected to the curved locking pin 252. Plate 250 is fixedly joined to shaft 248 so that they rotate simultaneously. A coil spring 254 is connected at one end to a rod 256 on the outer surface of end plate 92 and at the other end to a rod 258 mounted on plate 250. A hole 260 is provided in end plate 92 so that the spring 254 can be joined to rod 256. The rod 258 is positioned so that the spring 254 is above the center of shaft 248 when locking pin 252 is in unlocked position (FIG. 17) and the spring 254 is below the center of shaft 248 when locking pin 252 is in locked position (FIG. 15). The spring will hold the pin in either position until it is forced manually into the other position by movement of the pin end 253 which extends loosely through a vertical slot 264 in end plate 92 (FIG. 17).

Projecting downwardly from the lower surface of plate 70 is a vertical plate 685 having a hole 266 large enough to receive the end of pin 252 when it moves in an arcuate path through that hole and into hole 51. To permit such movement pin 252 moves freely through hole 268 in bottom plate 70. A guard plate 278 is mounted beneath the locking pin forward end to protect it from damage when the chock block is moved in and out of position. A downwardly extending member 665 is also mounted beneath bottom plate 70. Both of plates 685 and member 665 lie adjacent to the sides of track 42 so that twisting relative to the track is essentially avoided.

Figure 18:
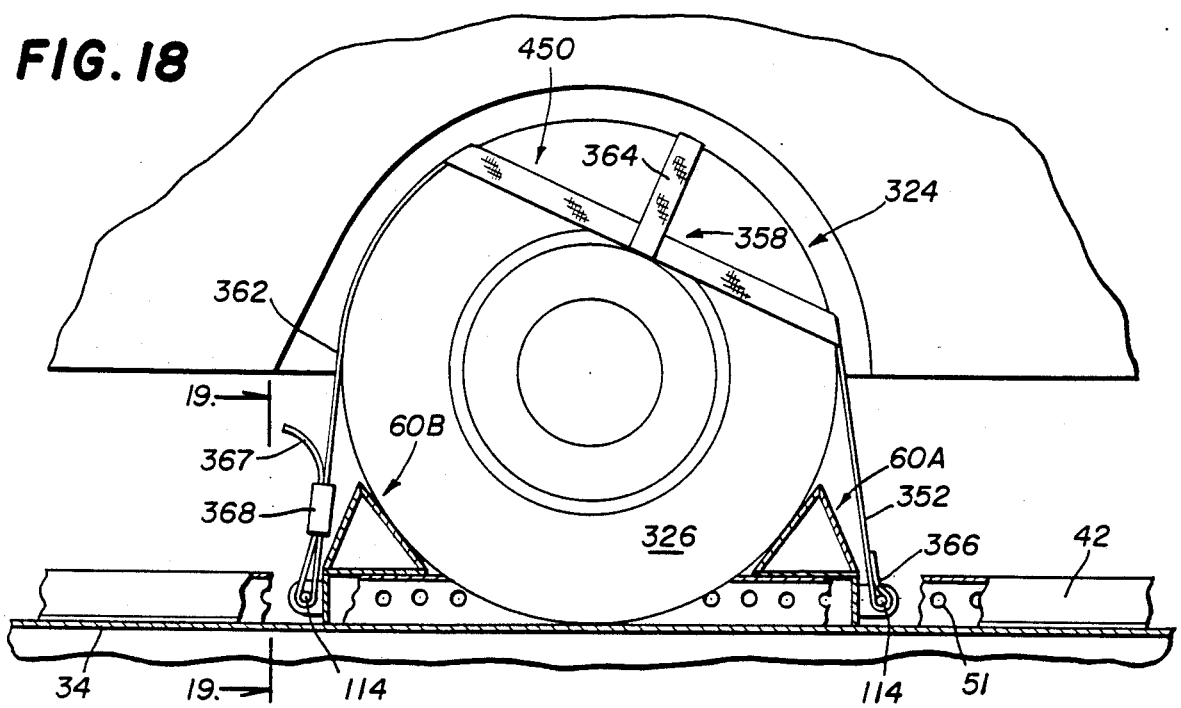
FIG. 18 is a side elevational view of a vehicle wheel tied down to a deck by use of a pair of chock blocks, one on each side of the wheel tire tread, and a tie-down strap run over the tire upper portion and connected at each end to one of the chock blocks.
Figure 19:
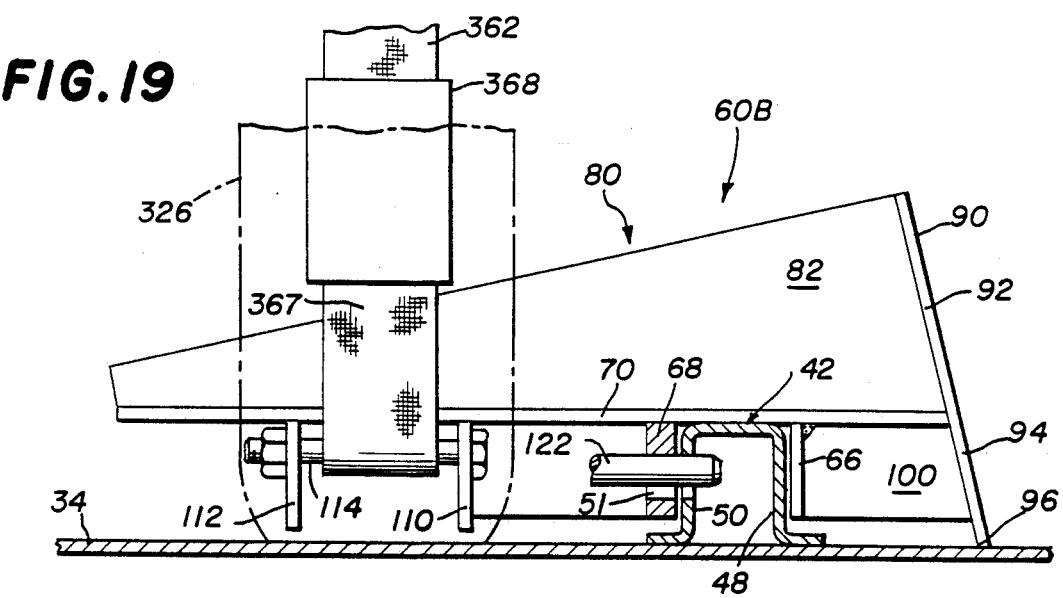
FIG. 19 is a side elevational view, partially in section, taken along the line 19—19 of FIG. 18.
Figure 20:
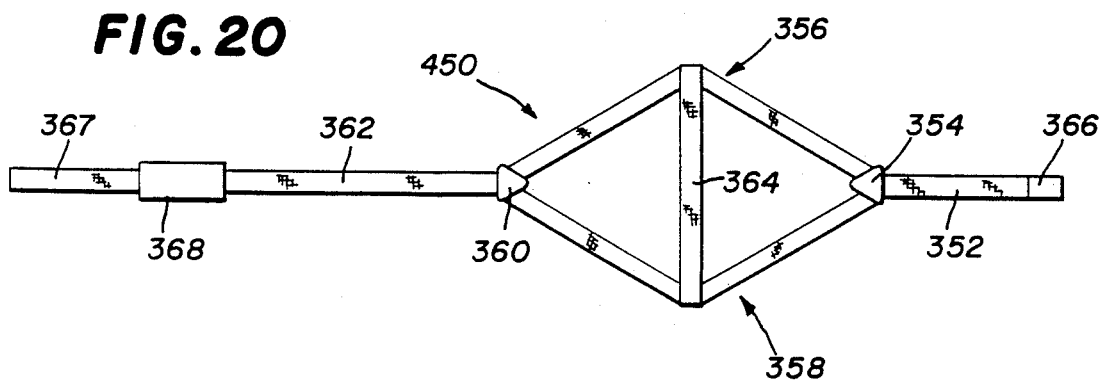
FIG. 20 is a plan view of the tie-down strap used in combination with the chock blocks shown in FIGS. 18 and 19.

FIGS. 18 to 20 illustrate the use of the chock blocks of this invention in combination with a tie-down strap to prevent horizontal and vertical movement of a vehicle tire.

As shown in FIG. 18, one chock block 60A can be placed on the right side of vehicle wheel 324 adjacent the tread face of tire 326 and a chock block 60B can be placed on the left side of the same wheel adjacent the tread face of tire 326. The chock blocks 60A and 60B are essentially like chock block 60 previously described herein. It will be seen, however, that chock block 60A has a pin 114 on its right side and chock block 60B has a pin 114 on its left side. The pins 114 provide means for connecting the ends of tie-down strap 350 to the chock blocks.

After the chock blocks 60A and 60B are positioned on track 42 adjacent the tread of tire 326 the chock blocks are secured in place on the track by means of pin 120 which enters a hole 51.

The tie-down strap 350 (FIGS. 18 to 20) has a straight section 352, a pair of outwardly branching and then inwardly converging portions 356,358 which extend from juncture 354 on straight section 352 to juncture 360 on straight section 362, and a lateral section 364 having its ends joined to the middle of each branching portion 356,358. The end 366 of straight section 352 is permanently connected to pin 114 on shock block 60A. A conventional winch 368 can be mounted on strap straight section 362 inward from the end so as to leave enough strap free end 367 to be passed-under pin 114 on chock block 60B and then into the winch to secure the strap to the chock block and permit use of the winch to tighten the strap and thereby put the strap in tension.

Once the chock blocks 60A,60B are put in position against opposing tread sides of the tire 326, the tie-down strap 350 is run over the top of the tire and positioned with branch 358 on the outer top side of the tire and branch 356 on the inner top side of the tire. This places the strap lateral section 364 approximately on top of the tire but located laterally or radially of the tire. The strap branch 358 will lie along the front face of the tire and the strap branch 356 will lie along the back face of the tire. Then the strap free end 367 is passed under pin 114 on chock block 60B and into winch 368. The strap is then tightened by use of the winch.

The pin 114 on each of the chock blocks 60A,60B is located on the second member of each chock block between the second member second end and the first member of each chock block. As a result, when the tie-down strap is tightened it pulls the second end of each chock block upwardly, but only for a small distance because the pin 122 is thereby moved to the top of track hole 51 and the bottom end 96 of leg 94 is pivoted downwardly against deck 34 (FIG. 19), so that no further vertical or upward movement of the chock block can occur. Also, the chock blocks cannot twist clockwise or counterclockwise when releasably connected to track 34 by pin 122 because the first member 62 nests closely with the track and prevents such movement. The bottom ends of member 110,112 prevent the second member second end from being pressed downwardly by pressure of a tire against it even when the chock blocks are used without a tie-down strap. Accordingly, the chock block of the invention provides excellent stability against movement regardless of the source of any force applied to it and this is achieved without having the chock block occupy much space and without the need for ancillary arms or track engaging members to obtain such stability.

Although FIGS. 18 and 19 show winch 368 mounted permanently on the tie-down strap, it is also feasible to place the winch permanently on pin 114 or to use a suitable fastener to attach it to the chock block in a similar location. The loose or free end 367 of the strap can then be threaded into the winch and tightened by means of the winch.

The foregoing detailed description has been given for clearness of understanding only, and no unnecessary limitations should be understood therefrom, as modifications will be obvious to those skilled in the art.

What is claimed is:

1. Transportation equipment having at least one deck for supporting and transporting four-wheel vehicles such as automobiles and trucks;
    at least one track secured to the deck;
    the track having a pair of substantially upwardly extending spaced apart surfaces;
    chock blocks for a vehicle transported on the deck to secure the vehicle against longitudinal movement;
    each chock block having a horizontal first member which nests with the track and is quickly removable from such nesting arrangement by upward displacement;
    each chock block having a second member substantially horizontally positioned and permanently laterally joined to the first member;
    the second member having first and second ends;
    the first member being located between and inward from the second member first and second ends;
    the second member having a flat bottom plate, extending for about its length;
    a pair of plates with lower edges joined to the bottom plate and sloped upwardly toward each other and with the plates having upper edges joined together;
    each of the pair of upwardly sloped plates being substantially triangular;
    the second member first end terminating beyond a vehicle tire tread face;
    the lower edges of the pair of plates being about the same length and terminating at the second end beyond the tire tread face;
    the second member being located above the car deck when the first member and the track are in nesting arrangement;
    a first support leg, located from the first end to the first member, extending downwardly from the second member to the deck; and
    a second support leg, located from the second end to the first member, extending downwardly from the second member to the deck.

2. Transportation equipment according to claim 1 in which:
the second member bottom plate in part constitutes a top plate for the first member; and
the first member includes a pair of spaced apart parallel vertical walls, which nest with the track, joined to the lower surface of the bottom plate.

3. Transportation equipment according to claim 1 in which:
each of the pair of upwardly sloped plates has an upward end edge; and
an end plate, sloped from vertical, and having a triangular upper portion is joined to the end of the bottom plate and to the end edges of the sloped plates, and the end plate has a lower portion projecting downwardly to the car deck.

4. Transportation equipment having at least one deck for supporting and transporting four-wheel vehicles such as automobiles and trucks;
at least one track secured to the deck;
the track having a pair of substantially upwardly extending spaced apart surfaces;
chock blocks for a vehicle transported on the deck to secure the vehicle against longitudinal movement;
each chock block having a horizontal first member which nests with the track and is quickly removable from such nesting arrangement by upward displacement;
each chock block having a second member substantially horizontally positioned and permanently laterally joined to the first member;
the second member having a sufficient length to extend along, and terminate beyond, the tread face of a tire of a vehicle located along side the track;
the chock block having means on the first member for removably securing the first member to the track, when in nesting position therewith, to prevent the first member and chock block from horizontal movement along the track and upward movement from the track;
a first chock block positioned adjoining the tread face at the front of a tire on a wheel of a vehicle on the deck;
a second chock block positioned adjoining the tread face at the rear of the same tire on said wheel;
the first and second chock blocks being removably secured to the track by the means for securing the first member of each chock block to the track; and
a tie-down strap connected to the first and second chock blocks and extending over the tire upper portion, with said tie-down strap in tension applying an upward force on each of the chock block second members adjacent the tire with said upward force being opposed by the means securing the first member to the track and by means on the second member, separate from and spaced from the first member, which can contact the deck and thereby maintain it substantially horizontal when an upward force is applied to the second member.

5. Transportation equipment according to claim 4 in which:
the means for removably securing the first member to the track when in nesting position therewith comprises a pin mounted on the chock block second member, said pin having a forward end;
the first member has a hole into which the pin forward end can extend through and into one of a plurality of horizontally disposed spaced apart holes in the track; and
the chock block has means to withdraw the pin forward end from the track hole to remove the chock block from the track.

6. Transportation equipment according to claim 4 in which:
the second member is located above the car deck when the first member and the track are in nesting arrangement; and
the second member has means separate from and spaced from the first member which maintains it substantially horizontal when upward and downward forces are applied to the second member.

7. Transportation equipment according to claim 4 in which:
the second member has a substantially flat bottom plate extending for about its length,
a plate with a lower edge is joined to the bottom plate and slopes upwardly; and
brace means extends from the sloped plate to the bottom plate.

8. A railroad car having at least one deck for supporting and transporting four-wheel vehicles such as automobiles and trucks;
at least one track secured to the deck longitudinally of the railroad car;
the track having a pair of substantially upwardly extending spaced apart surfaces;
chock blocks for each vehicle transported on the deck to secure the vehicle against longitudinal movement;
each chock block having a horizontal first member which nests with the track and is quickly removable from such nesting arrangement by upward displacement;
each chock block having a second member substantially horizontally positioned and permanently laterally joined to the first member;
the second member having a sufficient length to extend along, and terminate beyond, the tread face of a tire of a vehicle located alongside the track; and
the chock block having means on the first member for removably securing the first member to the track, when in nesting position therewith, to prevent the chock block first member from horizontal movement along the track;
a first chock block positioned adjoining the tread face at the front of a tire on a wheel of a vehicle on the deck;
a second chock block positioned adjoining the tread face at the rear of the same tire on said wheel;
the first and second chock blocks being removably secured to the track by the means for securing the first member of each chock block to the track; and
a tie-down strap connected to the first and second chock blocks and extending over the tire upper portion, with said tie-down strap in tension applying an upward force on each of the chock block second members adjacent the tire with said upward force being opposed by the means securing the first member to the track and by means on the second member, separated from and spaced from the first member, which can contact the deck and thereby maintain it substantially horizontal when an upward force is applied to the second member.

9. A railroad car according to claim 8 in which the second member has a bottom supported by the first member.

10. A railroad car according to claim 9 in which:
the second member has first and second ends;
the first member is located between and inward from the second member first and second ends;
a support leg, located from the first end to the first member, extends downwardly from the second member to the deck; and
a support leg, located from the second end to the first member, extends downwardly from the second member to the deck.

11. A railroad car according to claim 8 in which:
the means for removably securing the first member to the track when in nesting position therewith comprises a movable pin mounted on the chock block, said pin having a forward end;
the first member has a hole into which the pin forward end can extend through and into one of a plurality of horizontally disposed spaced apart holes in the track; and
the chock block has means to withdraw the pin forward end from the track hole to remove the chock block from the track.

12. A railroad car according to claim 8 in which:
the second member has a flat bottom plate, extending for about its length; and
a pair of plates with lower edges is joined to the bottom plate and sloped upwardly toward each other and with the plates having upper edges joined together.

13. A railroad car according to claim 8 in which the chock block second member has means for connecting a vehicle wheel tie down strap to the chock block.

14. A railroad car according to claim 8 in which:
the second member has a substantially flat bottom plate extending for about its length; and
a plate with a lower edge is joined to the bottom plate and slopes upwardly.

15. Transportation equipment having at least one deck for supporting and transporting four-wheel vehicles such as automobiles and trucks;
at least one track secured to the deck;
the track having a pair of substantially upwardly extending spaced apart surfaces;
chock blocks for a vehicle transported on the deck to secure the vehicle against longitudinal movement;
each chock block having a horizontal first member which nests with the track and is quickly removable from such nesting arrangement by upward displacement;
each chock block having a second member substantially horizontally positioned and permanently laterally joined to the first member;
the second member having first and second ends;
the first member being located between and inward from the second member first and second ends;
a first support leg, located from the first end to the first member, extending downwardly from the second member to the deck;
a second support leg, located from the second end to the first member, extending downwardly from the second member to the deck;
the second member being located above the car deck when the first member and the track are in nesting arrangement;
the second member first and second support legs maintaining it substantially horizontal and stationary when upward and downward forces are applied to the second member;
the second member having a sufficient length to extend along, and terminate beyond, the tread face of a tire of a vehicle located along side the track;
the chock block having means for removably securing the first member to the track, when in nesting position therewith, to prevent the first member and chock block from horizontal movement along the track and upward displacement off of the track;
a first chock block positioned adjoining the tread face at the front of a tire on a wheel of a vehicle on the deck;
a second chock block positioned adjoining the tread face at the rear of the same tire on said wheel;
the first and second chock blocks being removably secured to the track by the means for securing the first member of each chock block to the track; and
a tie-down strap connected to the first and second chock blocks and extending over the tire upper portion, with said tie-down strap in tension applying an upward force on each of the chock block second members adjacent the tire with said upward force being opposed by the means securing the first member to the track and by means on the second member, separate from and spaced from the first member, which can contact the deck and thereby maintain it substantially horizontal when an upward force is applied to the second member.

16. Transportation equipment according to claim 15 in which:
the second member has a substantially flat bottom plate extending for about its length; and
a plate with a lower edge is joined to the bottom plate and slopes upwardly.

17. Transportation equipment according to claim 15 in which:
the second member has a flat bottom plate, extending for about its length; and
a pair of plates with lower edges are joined to the bottom plate and slope upwardly toward each other and with the pair of plates having upper edges joined together.

18. Transportation equipment having at least one deck for supporting and transporting four-wheel vehicles such as automobiles and trucks;
at least one track secured to the deck;
the track having a pair of substantially upwardly extending spaced apart surfaces;
chock blocks for a vehicle transported on the deck to secure the vehicle against longitudinal movement;
each chock block consisting essentially of a first member, a second member and means on the first member for removably securing the first member to the track;
the first member nesting with the track and being quickly removable from such nesting arrangement by upward displacement;
the second member being substantially horizontally positioned and permanently laterally joined to the first member;
the second member having a sufficient length to extend along, and terminate beyond, the tread face of a tire of a vehicle located along side the track;
the chock block having means on the first member for removably securing the first member to the track, when in nesting position therewith, to prevent the first member and chock block from horizontal movement along the track and upward movement from the track; and the second member having means on opposite sides of, and separate from and spaced from, the first member, which maintains the second member substantially horizontal when upward and downward forces are applied to the second member.

19. Transportation equipment according to claim 18 in which the chock block has means for connecting a vehicle wheel tie down strap to the chock block.

20. Transportation equipment according to claim 18 in which:

the means for removably securing the first member to the track when in nesting position therewith comprises a pin mounted on the chock block, said pin having a forward end;

the first member has a hole into which the pin forward end can extend through and into one of a plurality of horizontally disposed spaced apart holes in the track; and the chock block has means to withdraw the pin forward end from the track hole to remove the chock block from the track.

21. Transportation equipment according to claim 18 in which the second member is located above the car deck when the first member and the track are in nesting arrangement.

22. Transportation equipment according to claim 18 in which:

the second member has first and second ends;

the first member is located between and inward from the second member first and second ends;

a support leg, located from the second member first end to the first member, extends downwardly from the second member to the deck; and a support leg, located from the second member second end to the first member, extends downwardly from the second member to the deck.

23. Transportation equipment according to claim 18 in which:

the spaced apart surfaces of the track are defined by spaced apart plate walls; and the first member has a pair of spaced apart plate walls which nest with the track walls.

24. Transportation equipment according to claim 18 in which:

the track is an inverted channel; and the first member defines a channel which has its open side facing downwardly and is sized to nest with the track in close proximity therewith.

25. Transportation equipment according to claim 18 having:

a first chock block positioned adjoining the tread face at the front of a tire on a wheel of a vehicle on the deck;

a second chock block positioned adjoining the tread face at the rear of the same tire on said wheel;

the first and second chock blocks being removably secured to the track by the means for securing the first member of each chock block to the track; and a tie-down strap connected to the first and second chock blocks and extending over the tire upper portion, with said tie-down strap in tension applying an upward force on each of the chock block second members adjacent the tire with said upward force being opposed by the means securing the first member to the track and by means on the second member, separate from and spaced from the first member, which can contact the deck and thereby maintain it substantially horizontal when an upward force is applied to the second member.

26. A railroad car having at least one deck for supporting and transporting four-wheel vehicles such as automobiles and trucks;

at least one track secured to the deck longitudinally of the railroad car;

the track having a pair of substantially upwardly extending spaced apart surfaces;

chock blocks for each vehicle transported on the deck to secure the vehicle against longitudinal movement;

each chock block having a horizontal first member which nests with the track and is quickly removable from such nesting arrangement by upward displacement;

each chock block having a second member substantially horizontally positioned and permanently laterally joined to the first member;

the second member having a sufficient length to extend along, and terminate beyond, the tread face of a tire of a vehicle located alongside the track;

the second member having a flat bottom plate, extending for about its length;

a pair of plates with lower edges joined to the bottom plate and sloped upwardly toward each other and with the plates having upper edges joined together;

each of the pair of upwardly sloped plates being substantially triangular and having an upward end edge;

an end plate, sloped from vertical, having a triangular upper portion joined to the end of the bottom plate and to the end edges of the sloped plates, and the end plate having a lower portion projecting downwardly to the car deck;

the second member having first and second ends;

the first member being located between the second member first and second ends;

the second member first end terminating beyond a vehicle tire tread;

the lower edges of the pair of plates being about the same length and terminating at the second end beyond the tire tread face; and the chock block having means on the first member for removably securing the first member to the track, when in nesting position therewith, to prevent the first member and chock block from horizontal movement along the track and upward movement from the track.

* * * * *

UNITED STATES PATENT AND TRADEMARK OFFICE
CERTIFICATE OF CORRECTION

PATENT NO. : 4,838,743

DATED : June 13, 1989

INVENTOR(S) : DONALD JACK BLUNDEN ET AL

It is certified that error appears in the above-identified patent and that said Letters Patent is hereby corrected as shown below:

Column 6, line 58, change "left" to -- leg --;

Column 12, line 65, change "separated" to -- separate --.

Signed and Sealed this

Sixth Day of February, 1990

Attest:

JEFFREY M. SAMUELS

*Attesting Officer*    Acting Commissioner of Patents and Trademarks